United States Patent [19]

Bodendorf

[11] Patent Number: 4,529,677

[45] Date of Patent: Jul. 16, 1985

[54] BATTERY SEPARATOR MATERIAL

[75] Inventor: Warren J. Bodendorf, Montgomery, Mass.

[73] Assignee: Texon Incorporated, Farmington, Conn.

[21] Appl. No.: 551,072

[22] Filed: Nov. 14, 1983

Related U.S. Application Data

[63] Continuation-in-part of Ser. No. 445,857, Dec. 12, 1982, abandoned, which is a continuation-in-part of Ser. No. 345,173, Feb. 2, 1982, abandoned.

[51] Int. Cl.³ .............................................. H01M 2/16
[52] U.S. Cl. ................................................... 429/252
[58] Field of Search ........................................... 429/252

[56] References Cited

U.S. PATENT DOCUMENTS 4,216,281  8/1980  O'Rell et al. ...................... 429/252
4,359,511  11/1982  Strzempko ........................ 429/252

FOREIGN PATENT DOCUMENTS

WO80/00591  11/1981  PCT Int'l Appl. ................ 429/252

Primary Examiner—Donald L. Walton
Attorney, Agent, or Firm—John P. Morley

[57] ABSTRACT

A novel, improved battery separator material particularly adaptable for use in maintenance free batteries. The battery separator material includes a diatomaceous earth filler, an acrylate copolymer binder and a combination of fibers comprising polyolefin, polyester and glass fibers.

10 Claims, No Drawings

BATTERY SEPARATOR MATERIAL

CROSS REFERENCE TO RELATED APPLICATION

This application is a continuation-in-part of U.S. patent application Ser. No. 445,857, filed Dec. 12, 1982 now abandoned which in turn is a continuation-in-part of U.S. patent application Ser. No. 345,173, filed Feb. 2, 1982 and now abandoned.

BACKGROUND OF THE INVENTION

1. The Field Of The Invention

This invention relates to battery separator materials. More precisely, this invention relates to relatively inexpensive, non-cellulosic, low ohmic resistance, maintenance free battery separators.

2. Description Of The Prior Art

Compact portable electrolytic cells or batteries including spaced apart metal plates connected in series for storage of electrical energy are well known to the art. An important factor involved in the development of such batteries is the use of thin, porous separators placed between alternating positive and negative plates. The primary function assigned the separator is to effectively prevent metallic conduction between the plates to avoid short circuiting. At the same time, the separator must permit free passage of electrolyte solution for effective ion exchange between the plates.

Commercial separators have been manufactured from wood, microporous rubber, fiberous glass mats, microporous plastics, cellulosic and fiberous materials impregnated with acid insoluble resins and synthetic and glass woven fiberous and porous vitrious materials. Additional details relating to battery separators can be found in U.S. Pat. Nos. 2,793,398; 3,890,184; 4,024,323; 4,055,711; 4,113,927; 3,753,784; 3,694,265; 3,773,590; 3,351,495; 3,340,100; 3,055,966; 3,205,098 and 2,978,529.

The growing evolution of the so-called "maintenance free" battery has presented special considerations and problems in the development of battery separators. The maintenance free battery is a sealed unit which does not require addition of water during the life of the battery. For many years, the separator industry has preferentially produced cellulosic separators impregnated or treated with phenol aldehydes. Phenol aldehyde impregnated cellulosic separators are described in detail in U.S. Pat. Nos. 3,272,657 and 3,247,025. These cellulosic separators presented an especially desirable combination of commercially attractive features including excellent electrical performance characteristics, low cost and good physical manufacturing properties. However, the outgassing properties in the cellulosic/phenolic type separator present problems in the maintenance free battery and this property has effectively disqualified phenol aldehyde impregnated cellulosic separators for use in permanently sealed units. Additionally, there has been a recent increase in environmental concern in the industry with the use of phenolic aldehydes.

Alternative separators have been developed by the industry for the maintenance free battery. However, these alternative separators have not presented the attractive combination of commercial features which led to the wide-spread acceptance and use of the earlier phenol aldehyde impregnated cellulosic separators. Instead, the alternative separators are generally associated with one or more commercially unattractive features such as high cost, and/or inferior electrical characteristics and/or poor physical properties and/or the use of materials of fabrication which are leachable or oxidizable thereby providing high chemical oxidation demand (C.O.D.).

In the development of alternative separators, particular emphasis has been placed on non-cellulosic separators providing good oxidation resistance and low ohmic resistance. The resistance to the passage of the electric current through the separator is an important factor, and is generally associated with the total porosity of the separator. As an approximation, the porosity may be assumed to be inversely proportional to the ohmic resistance. However, the manner in which porosity is achieved is also of special importance. The smaller the pore size, the more the tortuosity of the path of the electrolyte through the separator, thereby reducing the opportunity for formation of metallic deposits through the thickness of the separator which can cause a direct short. Porosity is achieved in most rubber and plastic type separators—whether formed by coagulation or extrusion techniques—by including small particles in the matrix which can be leached out by appropriate solutes after formation of the separator. This process provides a suitable degree of porosity but is intrinsically both costly and time consuming. In fiberous sheet separators, porosity is usually controlled by the selection of a variety of fiber diameters to regulate the size of the pores created at the interstices of the fiber crossover points and also by including relatively small amounts of siliceous type fillers. Separators providing high pore volumes can be achieved by this technique. However, the pore size and average pore size is somewhat larger than desired.

This invention is addressed to the outstanding problem in the art of providing a low cost, high performance, non-cellulosic separator for maintenance free batteries and presents an especially effective solution to the problem.

BRIEF SUMMARY OF THE INVENTION

The invention presents to the art, novel improved battery separator materials comprising a combination of selected fiber materials, a selected filler material and selected binder materials. Essentially, the selected fiber material includes a combination of polyolefin, polyester and glass fibers while the filler is a diatomaceous earth and the binder is an acrylate copolymer. In accordance with the practice of the invention, the combination of selected materials provides a low cost, non-cellulosic battery separator having an acid wettability of under five seconds exposure time, a total pore volume of about 70% or higher and providing an average pore size of about 5 to about 30 microns, a low chemical oxygen demand and an ohmic resistance below about 0.015 ohms per $in^2$. The battery separator materials of this invention are especially adaptable for use as separators in maintenance free batteries.

DESCRIPTION OF PREFERRED EMBODIMENTS

The battery separators of this invention comprise a selected combination of fibrous materials, filler material and binder material(s). The fiberous materials include a combination of polyolefin fibers, polyester fibers and glass fibers and the composition of the separator material is presented in more detail below:

|  | Percent By Weight in Separator | |
| --- | --- | --- |
|  | Range | Preferred Range |
| Polyolefin Fiber | 5–20 | 8–16 |
| Polyester Fiber | 2–15 | 5–12 |
| Glass Fiber | 0–20 | 12–18 |
| Filler | 40–75 | 45–60 |
| Binder | 7–20 | 8.5–17 |

Polyolefin pulp fibers comprise a portion of the fibrous materials of battery separators of the invention. The preferred polyolefin pulp fibers are synthesized from the polymerization of ethylene and/or propylene or mixtures thereof to provide polyethylene, polypropylene or copolymers of ethyelene and propylene. Preferably, the polyolefin pulp fibers have fiber diameters between about 0.01 to about 20 microns, a softening point below about 340° F. and are up to about 0.5 inches in length.

The polyolefin fibers most suitable in the practice of the invention are those which are characterized as synthetic wood fibers and have a surface treatment which provides improved wettability and dispersability in water. Additional properties of the preferred polyolefin fibers are (1) a surface tension of about 70 mN/m; (2) a specific gravity of less than one and preferably between about 0.900 to about 0.965 kg/dm$^3$; (3) a melting point between about 250° to about 340° F.; (4) a yield stress greater than 300 daN/cm$^2$, (5) a tensile strength at break of greater than 200 daN/cm$^2$; (6) a modulus of elasticity in tension of between about 7000 to about 20,000 daN/cm$^2$ and (7) a dielectric constant of about 2 to about 4, a dielectric strength of about 2 to about $5 \times 10^2$ kf/cm, and a transverse resistivity of about $10^{15}$ to about $10^{18}$ $\Omega$cm. The polyolefin fibers are used in amounts to provide between about 5 to about 20 percent by weight of the total weight of the finished separator and most preferably in amounts to provide between about 8 to about 16 percent by weight.

Polyester fibers are included in the battery separator materials of the invention. The polyester fibers are acid resistant and improve the overall strength of the separator particularly the puncture resistance and tear strength of the separator material. The most preferred polyester fibers are polyethylene terephthalate fibers having a denier between about 0.5 to about 2.2 and a length of at least about ¼ inches and preferably between about ¼ inches to about ¾ inches. The polyester fibers are used in amounts to provide between about 2 to about 15 and most preferably between about 5 to about 12 percent by weight of the total weight of the separator. A surfactant may be carried or otherwise associated with the surface of the polyester fiber to improve the dispersability of the fiber in water.

Acid resistant glass fiber (so-called "Chemical Grade") are preferably included in the separators of this invention to improve the wettability and wicking action of the separator and to provide improved stiffness. Suitable glass fibers have diameters ranging between about 2 microns to about 15 microns and preferably between about 6 microns to about 15 microns. The length of the glass fibers may range between about ⅛ inches to about ¾ inches and preferably between about ⅛ inches to about ⅜ inches. Combinations of glass fibers having different lengths and/or diameters have been suitably employed in the practice of the invention. The glass fibers are used in amounts to provide between 0 to about 20 and preferably between about 12 to about 18 percent by weight of the total weight of the separator. Glass fibers having a length of about ½ inch and a diameter of about 5–13 microns are particularly preferred since they provide a desirable degree of stiffness in the final separator. The preferred glass fibers of about ½ inch in length may be used as the only glass fiber in the separator or they may be used in combination with other glass fibers having different lengths and/or diameters. Glass fibers which have been treated with a water dispersable finish to provide improved dispersability in water are preferred in the practice of the invention.

The filler used in battery separators of this invention is diatomaceous earth which is also known as diatomite, infusorial earth and kieselguhr. Essentially diatomaceous earth is an amorphous silica formed from the fossilized remains of single celled aquatic plants called diatoms. Diatomaceous earth is characterized by its unique microscopic structure, chemical inertness, high absorptive capacity, internal porosity and great bulk per unit weight. The diatomaceous earths are commercially available in both natural or flux calcined grades. Natural grade diatomaceous earth is somewhat softer than the flux calcined grade and the flux calcined grade is definitely preferred in the practice of this invention. Typical properties of flux calcined grade diatomaceous earths are listed below:

| Color (dry) | white |
| --- | --- |
| TAPPI brightness % | 89–92 |
| Scum (maximum retained on 325 mesh) % | trace, 3% |
| Absorption[1] (water-average), lbs/100 lb. | 160 |
| Moisture content (maximum) | 1.0 |
| pH | 7.0 |
| Specific gravity | 2.30 |

The skeletal or cellular structure of the diatomaeous earth filler provides the porosity for the separators of the invention and the cost of this porosity generating filler is relatively low. The amount of filler used is important in generating the desired degree of porosity and is sufficient to provide between about 40 to about 75 and preferably between about 45 to about 60 percent by weight of the total weight of the separator. The preferred amounts provide a highly filled separator preferably having a total pore volume greater than about 80 percent with an average pore size between about 5 to about 30 microns, a preferred typical average pore size is about 22 microns while a preferred typical pore size distribution involves about 4 percent of the pores having a pore size greater than 45 microns, about 69 percent having a size between about 15–45 microns and about 27 percent having a size less than 15 microns. Pore size is determined on a mercury intrusion porisimeter. The ohmic resistance of separators of this invention—which as mentioned, is related to pore volume and pore size—is about 0.013 ohms inch$^2$ ±0.003.

The binder included in separators of this invention are self-crosslinking, non-coalescing (at room temperature) acrylate copolymers in which an acrylate moiety of the following formula represents about 80 percent or less preferably between about 80 to about 30 percent of the backbone moieties:

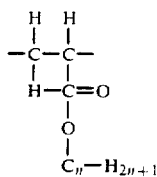

wherein is the integer 1–8 or somewhat higher but preferably 1–4.

Particularly suitable polymeric binders are copolymers including methyl or ethyl or butyl acrylate moieties with moieties of monomers having a >C=C< group and which provide acrylate copolymers having glass transition temperatures between about 30 30° C. to about +60° C. The glass transition temperatures ($T_g$) are measured by Differential Thermal Analysis on a Differential Scanning Colorimeter (E. I. duPont De Nemours Model 910) at a heating rate of 10° C./min. Especially suitable comonomers for binders of this invention are the so-called "hard" monomers such as methyl or ethyl methacrylate and styrene or derivatives of styrene such as alpha methyl styrene. Particularly preferred binders are methyl methacrylate/acrylate copolymers.

The preferred polymeric binders are further characterized as acrylate copolymers having a surfactant(s) attached to the copolymer molecule so as to be substantially non-leachable under the conditions of separator preparation and operation. Preferably the attached surfactant is an anionic surfactant such as a sulfo-succinate ester present in an amount between about 0.25 to about 2.5 percent by weight of the copolymer. Preferred polymeric binders of this invention are further characterized as having intrinsic viscosities between about 0.8 to about 2.0 at 30° C. Intrinsic viscosities are measured on a freshly prepared copolymer latex (to minimize cross-linking effect) using an amount of the latex sufficient to provide about 0.3 to about 0.4 grams copolymer solid. The amount is placed in 100 mls dimethyl formamide, allowed to dissolve and flow rates of solution and solvent alone are measured at 30° C. in an Ostwald type viscometer.

The especially preferred acrylate copolymers are those which have a silane coupling agent attached to or included in the polymer backbone. These especially preferred acrylate copolymers are commercially available and can be prepared by copolymerizing the acrylate copolymer monomers with a silane coupling agent having ethylenic unsaturation which can undergo free radical polymerization. The amount of silane coupling agent in the acrylate copolymer can represent from about 0.2 to about 2.0 percent by weight. Especially preferred silane coupling agent containing acrylate copolymers include methyl methacrylate/acrylate copolymers and styrene/acrylate copolymers. The silane coupling agent containing acrylate copolymers provide improved internal bonding between the silaceous components (glass fibers and diatomacious earth) of the separator. Battery separators including the preferred silane coupling agent containing acrylate copolymers exhibit especially superior resistance to corrosive acids.

When combined with the fiber and filler materials, the acrylate copolymer binders of this invention provide a separator which is acid wettable but not water wettable. By "acid wettable" it is meant that a drop of sulfuric acid solution (1.2 specific gravity) placed on the surface of a separator of this invention will be substantially completely absorbed or otherwise not discernable as a drop within about five seconds or less. By "not water wettable", it is meant that a drop of water placed on the surface of the separator will not be completely absorbed but will be discernable as a drop for about 30 minutes and preferably for about 60 or longer. The binder is used in amounts to provide between about 7 to about 20 and most preferably between about 8.5 to about 17 percent by weight of the finished separator.

The polymeric binders are used as latex dispersions which have an acid pH. Typical properties of separators formed with the latex disperions include a tensile of about greater than about 10 lbs/in. and a puncture of more than about 400 grams.

Essentially separators of this invention are produced by forming an aqueous dispersion of the above described fiber materials, filler material and binder material, sequentially adding dispersing and flocculating agents to the dispersion, applying the flocculated agglomerates to the wire of a web forming apparatus to provide a web product having a thickness of about 30 mils and dewatering the product.

The preferred preparation of separators of the invention, particularly at a pilot plant or full production scale, involves a retention acid or system which utilizes a charge-reverse-charge mechanism. The procedure can be performed on standard papermaking apparatus such as a fourdrinier, an inclined fourdrinier, a cylinder machine, a rotoformer or the like. According to this procedure, the pulper is first charged with water and the polyolefin fibers. The polyolefin fibers are cleared by circulation through a refiner usually for about 20 minutes, then the diamtomaceous earth and the polyester and glass fibers are added. A dispersion of a heavily anionic material is then charged to the pulper. The preferred anionic material is a carboxylated acrylamide and the amount used is preferably about 0.2% by weight of the total furnish. The anionic material functions as a dispersing agent and imposes a heavy anionic charge on the fiber and filler materials. The latex binder which is also anionic in character is then added as the last ingredient. Accordingly, unlike usual beater addition procedures, no flocculation occurs in the pulper. It has been found that if flocculation of the ingredients occurs in the pulper, shear forces generated by agitation and pumping can cause the latex particles to be dislodged from their bonding sites on the fiber.

The unflocculated furnish is then charged to the machine chest of a papermaking machine by way of a pump—such as a fan pump. The furnish is preferably flocculated at the fan pump by mixing a cationic flocculating agent—preferably a polyelectrolyte—with the furnish. The amount of cationic flocculating agent added to the dispersion at this point can be regulated to control the size of the flocculated agglomerates deposited on the wire which permits adjustment and/or control of drainage time and retention rate for optimum results. According to this procedure, retention rates of 97–98 percent can be achieved.

The flocculated agglomerates charged to the machine chest are transferred to the moving wire of the papermaking machine as a web for drainage of water. After draining the water by gravity, suction may be applied to remove further water from the web. The web may then be pressed between felt rolls and dried on drying cans. Suitable drying temperatures are between about 230° to about 260° F. and during drying at least some crosslinking of the binder material occurs.

Another procedure for avoiding the effect of shear forces on the materials dispersed in the pulper involves a variation of the above-described preferred preparation. According to this alternative procedure, a cationic flocculating agent is first added to the material dispersed in the pulper to obtain retention of the binder and filler. Reduction in particle size of the flocculated material by the shear forces is controlled by adding a highly anionic colloid such as deacetylated Karaya Gum or a high molecular weight anionic colloid after addition of the cationic flocculating agent. The anionic colloid provides a negative charge on the flocculated agglomerates which disperses the agglomerates into smaller particles which are resistant to further reduction in size in response to the encountered shearing forces. The cationic flocculating agent is reintroduced to the dispersion preferably at the fan pump and the flocculated material is charged to the machine chest, transferred to the moving cure and dried as described before. This alternative procedure is more analogous to typical beater addition procedures known to the art.

The invention as well as manners of making and using it will be more fully appreciated from the following illustrative, non-limiting Examples.

EXAMPLE 1

The following materials were added in the sequence listed to a Williams 10"×12" hand sheet mold:

| Polyolefin Fiber[1] | 6.96 grams (42% solids) |
|---|---|
| Filler 2.(Diatomaceous Earth) | 14.4 grams (diluted to 3% consistency in water and defibered in a Waring Blender for 2 minutes) |
| Glass Fiber | 0.81 grams (¾" × 5.6 microns) |
|  | 0.81 grams (⅛" × 5.6 microns) |
| Polyester Fiber[3] | 0.81 grams (defibered in Waring Blender for 20 seconds) |
| Anionic Colloid[4] | 60 grams (at 0.1% solids) |
| Polymeric Binder[5] | 4.05 mls (1.971 grams solid) |
| Cationic Flocculating Agent[6] | 0.3 mls. |

[1] The polyolefin fibers used in this and in Examples 2-4 are synthetic wood pulp fibers having an average fiber diameter of 4.9 microns and are supplied by Hercules Powder Company under the tradename PULPEX EA.
2. The filler used in this and all other Examples is a diatomaceous earth having a median particle size of 16 microns. The filler is supplied by Johns Mansville under the trade name CELITE 110.
[3] The polyester fiber used in this and in Examples 2-4 is a ¼", 1.5 denier polyethylene terephthalate fiber supplied by E. I. DuPont De Nemours under the tradename DACRON.
[4] The anionic colloid used in this Example was prepared by mixing together 1.16 lbs of a carboxylated acrylamide sold under the tradename BETZ DP-791 by Betz Paper Chemical Incorporated with 44.5 gallons of water. The carboxylated acrylamide anionic colloid was added by addition method and the dispersion was mixed with slow agitation until the colloid was dissolved.
[5] The polymeric binder used in this Example is a styrene/butyl acrylate copolymer having a silane coupling agent attached to the polymeric backbone and was supplied by National Starch and Chemical Corporation under the designation 78-6170. The binder is supplied and used as a latex dispersion and has a pH between 4.0 to 5.0, a wet weight of 8.64 lbs. per gallon, a dry weight of 4.181 lbs. per gallon, a percent solids of 48.0%, a specific gravity of 1.036 and a Brookfield viscosity of 310 cps.
[6] The cationic flocculating agent used in this Example is a polyethyleneimine which is supplied by BASF Wyandotte under the tradename POLYMIN P. The flocculent was prepared by diluting 5 gallons of POLYMIN P in 45 gallons of water.

The above materials were diluted to a 1.5% consistency and drained through a 72×76 plastic wire screen.

Drainage time was three (3) seconds. The sheet was wet pressed and dried.

The dried separator sheet material had the following composition:

|  | Percent by Weight of Separator Material |
|---|---|
| Polyolefin Fiber | 13.4 |
| Polyester Fiber | 3.7 |
| Glass Fiber | 7.5 |
| Filler | 66.3 |
| Binder | 9.1 |

The ohmic resistance of separators of the above composition having a sheet gauge of 0.0285" was measured and the following results were obtained:

| 20 minute ohmic resistance | 0.0120 ohms |
|---|---|
| 24 hour ohmic resistance | 0.0105 ohms |

Porosity characteristics of the sheet material were determined and the following results were obtained:

| Total Porosity | 68.8466% |
|---|---|
| Maximum Porosity | 69.0021% |
| Porosity due to Pores Less Than 0.06223 Micron Diameter | 0% |
| Average Pore Size | 7.767 microns |
| % of Pores Greater than 20 Microns | 7.5916% |

Acid Wet Out for the sheet material was instantaneous and the sheet material was not Water Wettable.

Battery cell tests with cells made with the separator material show excellent charge acceptance, cold crank performance and no degradation under an overcharge paste test.

The separator material was subject to refluxing sulfuric acid dichromate solution for three hours and showed an average weight loss of from 1% to 2% maximum with no blistering or delamination occurring.

EXAMPLE 2

A furnish was prepared by adding the following materials to a pulper in the order listed. (The materials are the same as used in Example 1):

| Water | 2500 gallons |
|---|---|
| Polyolefin Fiber | 260 lbs (dry) |
| Filler | 1100 lbs |
| Glass Fiber (¼" × 13.0 microns) | 280 lbs. |
| Polyester Fiber | 100 lbs. |
| Annionic Colloid | 172 gals. 0.3% solids |
| Binder | 62 gallons |
| Cationic Flocculating Agent[7] |  |

[7] The cationic flocculating agent used in this Example and in all following Examples is a polyamine which is supplied by Betz Corporation under the tradename BETZ 1185. The flocculant was prepared by diluting one gallon of BETZ 1185 in 50 gallons of water.

The fiber and filler materials were dispersed in the sequence noted above to provide a uniform dispersion. The fiber and filler materials were negatively charged by the addition of the anionic colloid dispersing agent. Addition of the anionically charged binder completed the pulper cycle and the dispersion was then pumped to the machine chest of a rotoformer papermaking machine. The pump used to charge the machine chest was a fan pump and at the fan pump, the cationic flocculating agent was added to and mixed with the dispersion at a rate of about 48 gallons per hour. Water was added to maintain the dispersion in the machine chest at a consistency of about 1.2%.

The dispersion was fed onto the moving screen of the rotoformer to provide a web, water was allowed to drain and then suction was applied to the web. The wet web was then passed between a roll over felt press and then dried by passing it over heated rolls to heat the web to about 255° F.

The dried separator sheet material had the following composition:

|  | Percent by Weight of Separator Material |
|---|---|
| Polyolefin Fiber | 12.87 |
| Polyester Fiber | 6.93 |
| Glass Fiber | 13.86 |
| Filler | 54.45 |
| Binder | 12.7 |

A battery separator prepared as described had the following properties:

| Property | Value |
|---|---|
| Backweb $t_b$ ins | 0.027 |
| Overall $t_b$ ins | 0.045 |
| Weight/area g/m$^2$ | 238 |
| Ohmic Resistance | 0.016 |
| 20 mins in$^2$ | |
| 24 hours in$^2$ | 0.014 |
| 48 hours in$^2$ | 0.013 |
| Apparent density[1] | 0.3952 |
| % Porosity | 74 |
| Pore diameter avg. in microns | 14 |
| % Volume greater than 20 microns | 20 |
| Gradient Columar density % | 1.74 |
| Tensile strength lbs. | 16.2 |
| % Elongation | 1.0 |
| Acid Wettability | Instantaneous |
| Water Wettability | 60+ minutes |
| COD | 1400 ppm |
| Puncture Resistance | Greater than 600 grams |

[1] Measured on an Aminco Mercury Porosimeter under liquid mercury pressure.

The battery separator was used in a lead-acid storage battery and tested for performance according to the Battery Counsel Industry (BCI) recommended specifications for vehicular, ignition lighting and starting types. The results are as follows:

| Discharge Performance Characteristics | |
|---|---|
| Reserve Capacity 25 amps at 80° F. minutes to 10.5 volts | 64.6 minutes |
| Cold Crank 450 amps at 0° F. voltage at 30 sec. | 8.16 volts |

EXAMPLE 3

The following materials were added in the sequence listed to a Williams 10"×12" hand sheet mold:

| | |
|---|---|
| Polyolefin Fiber | 6.96 grams (42% solids) |
| Filler | 14.4 grams (diluted to 3% consistency in water and defibered in a Waring Blender for 2 minutes) |
| Glass Fiber | 0.81 grams (¼" × 5.6 microns) |
| | 0.81 grams (¼" × 5.6 microns) |
| Polyester Fiber | 0.81 grams (defibered in Waring Blender for 20 seconds) |
| Cationic Flocculating Agent | 0.3 ml. |
| Polymeric Binder[8] | 4.05 mls (1.971 gms solid) |
| Anionic Colloid[9] | 10 grams (0.1 gms solid) |

[8] The polymeric binder used in this Example was a styrene/butyl acrylate copolymer supplied by National Starch and Chemical Corporation under the designation 78-6132. The binder is supplied and used as a latex dispersion and has a pH of 4.9, a wet weight of 8.64 lbs. per gallon, a dry weight of 4,181 lbs. per gallon, a percent solids of 48.4, a specific gravity of 1.036 and a Brookfield viscosity of 310 cps.
[9] The anionic colloid used in this Example was prepared by mixing together the following materials:

| | |
|---|---|
| Water 60° C. | 33½ gallons |
| Triethanolamine | 17.5 cc. |
| Ammonia | 300 cc. |
| Karaya Gum Powder | 4.5 lbs. |

Cold water was then added to increase the volume to 50 gallons. The weight of Karaya Gum Powder in the dispersion was 1% by weight.

The above materials were diluted to a 1.5% consistency and drained through a 72×76 plastic wire screen. Drainage time was three (3) seconds. The sheet was wet pressed and dried.

The dried separator sheet material had the following composition:

|  | Percent by Weight of Separator Material |
|---|---|
| Polyolefin Fiber | 13.4 |
| Polyester Fiber | 3.7 |
| Glass Fiber | 7.5 |
| Filler | 66.3 |
| Binder | 9.1 |

The ohmic resistance of separators of the above composition having a sheet gauge of 0.0285" was measured and the following results were obtained:

| 20 minute ohmic resistance | 0.0120 ohms |
|---|---|
| 24 hour ohmic resistance | 0.0105 ohms. |

Porosity characteristics of the sheet material were determined and the following results were obtained:

| | |
|---|---|
| Total Porosity | 68.8466% |
| Maximum Porosity | 69.0021% |
| Porosity due to Pores Less Than 0.06223 Micron Diameter | 0% |
| Average Pore Size | 7.767 microns |
| % of Pores Greater than 20 Microns | 7.5916% |

Acid Wet Out for the sheet material was instantaneous and the sheet material was not Water Wettable.

Battery cell tests with cells made with the separator material show excellent charge acceptance, cold crank performance and no degradation under an overcharge paste test.

The separator material was subject to refluxing sulfuric acid dichromate solution for three hours and showed an average weight loss of from 1% to 2% maximum.

EXAMPLE 4

The same amounts of the same fiber materials, filler, cationic flocculant and anionic colloid as in Example 3 were used to prepare Separators A, B, C, D, E and F of this Example. However, the binder material used in preparing the Separators of this Example was different and the amount used was sufficient to provide 9, 10, 11, 12, 13 and 14 percent by weight of binder in Separators A, B, C, D, E and F respectively. The different binder material used in this Example is a methyl methacrylate/butyl acrylate copolymer supplied by National Starch and Chemical Corporation under the designation 78-6139. The binder is supplied and used as a latex dispersion and has a pH of 4.2, a wet weight of 8.94 lbs. per gallon, a dry weight of 4.326 lbs. per gallon, a percent solids of 48.4, a specific gravity of 1.070 and a Brookfield viscosity of 310 cps. The ohmic resistance of the Separators are listed in tabular form below:

TABLE 1

| Separator | % by Weight Binder | 20 Minutes Ohmic Resistance | 24 Hour Ohmic Resistance |
|---|---|---|---|
| A | 9 | 0.0100 | 0.0090 |
| B | 10 | 0.0104 | 0.0100 |
| C | 11 | 0.0104 | 0.0090 |
| D | 12 | 0.0125 | 0.0100 |
| E | 13 | 0.0114 | 0.0110 |
| F | 14 | 0.0120 | 0.0114 |

Acid Wet-Out for each Separator material of Table 1 was instantaneous and each Separator was not Water Wettable.

Battery cell tests with each Separator of Table 1 show excellent charge acceptance, cold crank performance and no degradation under an overcharge plate test.

Average weight losses for each Separator of Table 1 after three hours of immersion in refluxing sulfuric acid dicromatic solution were 1% to 2% maximum.

EXAMPLE 5

A furnish was prepared by adding the following materials to a pulper in the order listed.

| | | | |
|---|---|---|---|
| Water | | | |
| Polyolefin Fiber[11] | 240 lbs. | (dry) | (620 lbs. wet) |
| Filler | 950 lbs. | | |
| Glass Fiber | | | |
| ¼" × 12 microns | 155 lbs. | (dry) | (182 lbs. wet) |
| ½" × 12 microns | 155 lbs. | (dry) | (193.75 lbs. wet) |
| Polyester Fiber[12] | 200 lbs. | (dry) | |
| | 6 lbs. | (dry) | (240 gals.) |
| Anionic Colloid[13] | 300 lbs. | (dry) | (77.5 gals.) |
| Binder[14] | | | |
| Cationic Flocculating | | | |

| Agent | |
|---|---|

[11]The polyolefin fibers used in this Example are synthetic wood fibers having an average fiber diameter of about 5-10 microns and are supplied by Mitsui Corporation.
[12]The polyester fiber used in this Example is a ¼" × 1.5 denier supplied by Hoechst under the tradename TREVIRA 101.
[13]BETZ 1185 (See 4. Example 1.)
[14]The polymeric binder used in this Example is a styrene acrylate copolymer having a silane coupling agent attached to the polymeric backbone and was supplied by National Starch and Chemical Corporation under the designation 78-6187. The binder is supplied and used as a latex dispersion and has a pH of about 4.7 a wet weight of 8.6 lbs. per gallon, a dry weight of 3.87 lbs. per gallon, a percent solids of 45%, a specific gravity of 1.029 and a Brookfield viscosity of 300 cps.

The fiber and filler materials were dispersed in the sequence noted above to provide a uniform dispersion. The fiber and filler materials were negatively charged by the addition of the anionic colloid dispersing agent. Addition of the anionically charged binder completed the pulper cycle and the dispersion was then pumped to the machine chest of a fourdrinier papermaking machine. The pump used to charge the machine chest was a fan pump and at the fan pump, the cationic flocculating agent was added to and mixed with the dispersion at a rate of about 228 gallons per hour. Water was added to maintain the dispersion in the machine chest at a consistency of about 3%.

The dispersion was fed onto the moving screen of the rotoformer to provide a web, water was allowed to drain and then suction was applied to the web. The wet web was then passed between a roll over felt press and then dried by passing it over heated rolls to heat the web to about 255° F.

The dried separator sheet material had the following composition:

| | Percent by Weight of Separator Material |
|---|---|
| Polyolefin Fiber | 12 |
| Polyester Fiber | 10 |
| Glass Fiber | 15.5 |
| Filler | 47.5 |
| Binder | 15. |

A battery separator prepared as described had the following properties:

| Property | Value |
|---|---|
| Backweb $t_b$ ins | 0.0313 |
| Overall $t_b$ ins | 0.060 |
| Weight/area g/m² | 196.5 |
| Ohmic Resistance | |
| 20 mins in² | 0.0121 |
| 24 hours in² | 0.0108 |
| Apparent density | 0.313 |
| % Porosity | 83.61 |
| Pore diameter avg. in microns | 24.8 |
| % Volume greater than 20 microns | 57. |
| Tensile strength lbs. | 11.91 |
| % Elongation | 1.32 |
| Acid Wettability (seconds) | 0.8 seconds |
| Water Wettability (minutes) | 30 minute + |
| COD | 1972 |
| Puncture Resistance (gms) | 469 gm |

The battery separator was used in a lead-acid storage battery and tested for performance according to the Battery Counsel Industry (BCI) recommended specifications for vehicular, ignition lighting and starting types. The results are as follows:

| Discharge Performance Characteristics | |
|---|---|
| Reserve Capacity 25 amps at 80° F. minutes to 10.5 volts | 64.6 minutes |
| Cold Crank 450 amps at 0° F. voltage at 30 sec. | 8.16 volts |

The battery separators of Examples 1, 2 and 5 include the especially preferred acrylate copolymer having a silane coupling agent attached to or included in the polymer backbone. Separators containing the especially preferred acrylate copolymers exhibit superior resistance to corrosive acids and this is an important performance characteristic for maintenance free battery separators. As those in the art know, a battery undergoes plate formation via an electrical charge during construction. Frequently during such plate formation, charging conditions may be inadvertently exceeded leading to higher than desired temperatures in the battery. Currently available maintenance free battery separators tend to blister or delaminate under these temperature conditions, resulting in short circuiting of the plates. A test to determine the propensity of a separator to delaminate or blister under the above described conditions involves refluxing a sample of the separator in a sulfuric acid dichromate solution for three hours. After refluxing, the sample is examined to determine if blistering or delamination has occurred and the degree of blistering or delamination which has occurred. Separators of Examples 1, 2 and 5 show no blistering or delamination under these test conditions.

From the above description, it will be apparent that this invention presents to the art novel, improved, acid wettable, non-cellullosic battery separators particularly adaptable for use in maintenance free batteries. Moreover, the separators present the distinctive combination of excellent electrical performance characteristics, low material and production costs and good physical properties and manufacturing features. The separators have low ohmic resistance, low chemical oxygen demand and excellent porosity characteristics in terms of pore volume and low average pore size generated by using a large amount of a relatively inexpensive filler. Accordingly, the novel separators of this invention provide unexpected advantages in terms of overall performance characteristics, cost and manufacture as compared to those known to the art at the time the invention was made.

I claim:

1. A battery separator which is acid wettable but not water wettable and which comprises a substantially uniform mixture of from about 5 to about 20 percent by weight of the separator of polyolefin fiber, from about 2 to about 15 percent by weight of polyester fiber, from 0 to about 20 percent by weight of glass fiber, from about 40 to about 75 percent by weight of diatomaceous earth and from about 7 to about 20 percent by weight of an acrylate copolymer binder which includes a silane coupling agent attached to the polymeric backbone, said separator being characterized by a total pore volume of about 70 percent or higher with an average pore size between about 5 to about 30 microns and an ohmic resistance of about 0.015 ohms per inch$^2$ or less.

2. A battery separator of claim 1 which comprises from about 8 to about 16 percent by weight of polyolefin fiber, from about 5 to about 12 percent by weight of polyester fiber, from about 12 to about 18 percent by weight of glass fiber, from about 45 to about 70 percent by weight of diatomaceous earth and from about 8.5 to about 17 percent by weight of binder.

3. A battery separator of claim 1 where the total pore volume is greater than about 80 percent and the average pore size is between about 15 to about 30 microns.

4. A battery separator of claim 1 where the binder is a copolymer of methyl acrylate or ethyl acrylate or propyl acrylate or butyl acrylate or mixtures of these.

5. A battery separator of claim 1 where the binder is a copolymer of methyl methacrylate and ethyl acrylate, methyl methacrylate and butyl acrylate, styrene and ethyl acrylate, styrene and butyl acrylate and mixtures of these.

6. A battery separator of claim 1 where the diatomaceous earth is a flux calcined grade diatomaceous earth.

7. A battery separator of claim 1 where the total pore volume is between about 70 to about 90 percent.

8. A battery separator of claim 1 where the glass fiber includes glass fibers having a length of about ½ inch and a diameter between about 2 to about 15 microns.

9. A battery separator of claim 1 where the glass fiber includes glass fibers having a length of about ½ inch and a diameter between about 2 to about 15 microns in combination with glass fibers having a different length and/or a different diameter.

10. In a battery with an electrolyte and a positive plate and a negative plate separated by a battery separator, the improvement where said separator is a separator of claim 1.

* * * * *